Figure 1:
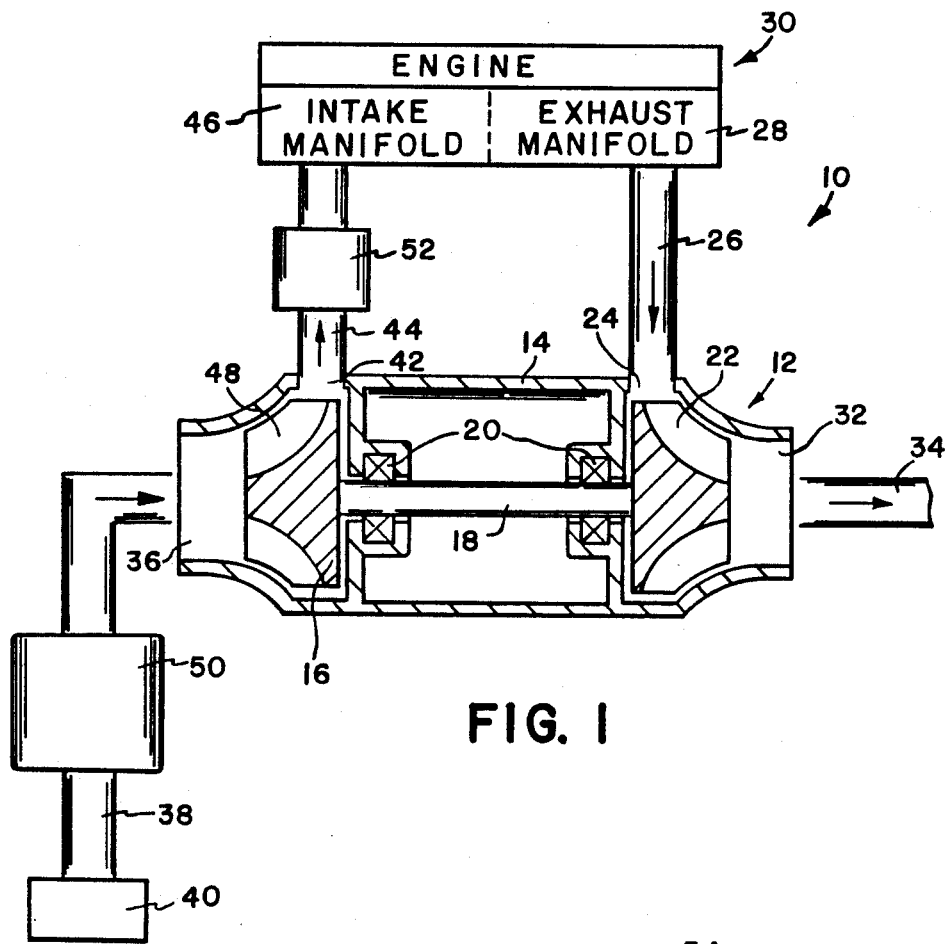

United States Patent [19]

Allen

[11] Patent Number: 4,969,536
[45] Date of Patent: Nov. 13, 1990

[54] TURBOCHARGER NOISE SILENCER
[75] Inventor: John F. Allen, El Sequndo, Calif.
[73] Assignee: Allied-Signal Inc., Morristown, N.J.
[21] Appl. No.: 427,025
[22] Filed: Oct. 26, 1989
[51] Int. Cl.$^5$ ............................................. F02M 35/00
[52] U.S. Cl. .................................... 181/229; 181/225; 181/226; 181/240; 181/249; 181/252; 181/269; 181/277; 415/119
[58] Field of Search ........................ 181/214, 225-232, 181/240, 252, 269, 277, 249; 415/119

[56] References Cited
U.S. PATENT DOCUMENTS

| | | | |
|---|---|---|---|
| 2,749,998 | 6/1956 | Walton et al. | 181/229 |
| 2,869,670 | 1/1959 | Hoffman | 181/229 |
| 3,578,107 | 5/1971 | Everett et al. | 181/232 |
| 3,981,778 | 9/1976 | Potter | 181/230 |
| 4,204,586 | 5/1980 | Hani et al. | 181/229 |
| 4,411,592 | 10/1983 | Traven et al. | 415/119 |
| 4,667,769 | 5/1987 | Appel | 181/229 |

Primary Examiner—Benjamin R. Fuller
Attorney, Agent, or Firm—Ken C. Decker; W. N. Antonis

[57] ABSTRACT

A charge air system for an internal combustion engine includes a compressor wheel which is rotated to draw ambient air into a housing, compress the air, and to force the air through a discharge conduit into the the intake manifold of an internal combustion engine. The silencers may be placed in the inlet conduit or the outlet conduit to attenuate pressure fluctuations in the conduits, which are a source of significant noise.

10 Claims, 1 Drawing Sheet

TURBOCHARGER NOISE SILENCER

This invention relates to charge air systems for internal combustion engines and, more particularly, to apparatus for attenuating noise generated in charge air systems.

Charge air systems for internal combustion engines include turbochargers and superchargers. These devices include a rotating compressor wheel which draws in ambient air (which is normally filtered to remove contaminants), compresses the air drawn, and then forces the compressed air into the intake manifold of an internal combustion engine. One problem with turbochargers and superchargers is that unpleasant noise may be generated during their operation. Prior art attempts have been made to attenuate or reduce noise generated by such charger systems. These prior art attempts include intake silencers, such as those shown in U.S. Pat. Nos. 4,667,769; 2,749,998; 4,204,586; and 2,869,670. However, it has been discovered that substantial noise is generated by pressure fluctuations in the conduits that communicate air through the conduits and into the intake manifold. The compressor wheel used to compress air in such systems generates pressure fluctuations of varying frequencies in these conduits. When these fluctuations occur at critical frequencies, substantial undesirable noise results. It has been found that if these pressure fluctuations, particularly at the critical frequencies, can be attenuated, the undesirable noise is substantially reduced. Accordingly, the present invention provides a device for attenuating pressure fluctuations in the conduit communicating air to the compressor wheel of a charge air system and/or in the conduit communicating compressed air from the compressor wheel to the intake manifold of the engine.

Figure 2:
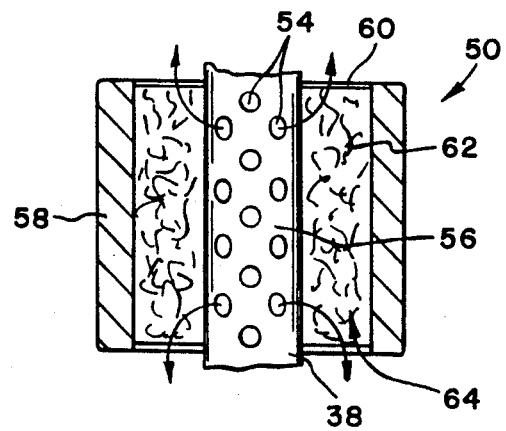

These and other advantages of the present invention will become apparent from the following description, with reference to the accompanying drawings, in which;

FIG. 1 is a schematic illustration of a charge air system in which pressure fluctuations in the conduits leading to and from the compressor wheel are attenuated in accordance with the present invention; and FIG. 2 is a cross-sectional view of a pressure fluctuation attenuator suitable for practicing the present invention.

Referring now to the drawings, a charge air system generally indicated by the numeral 10 includes a turbocharger generally indicated by the numeral 12, which includes a housing 14. A compressor wheel 16 is mounted on a shaft 18. Shaft 18 is rotatably mounted in the housing 14 by bearings 20. A turbine wheel 22 is mounted on the end of the shaft 18 opposite the end upon which the compressor wheel 16 is mounted. Exhaust gases are communicated to the turbine wheel 22 through opening 24 in the housing 14, which communicates with an exhaust gas conduit 26 which connects with the exhaust manifold 28 of an internal combustion engine generally indicated by the numeral 30. Exhaust gases are discharged from the turbine wheel 22 through opening 32 into the tail pipe 34.

Ambient air is communicated through inlet conduit 38 to an inlet opening 36 of turbocharger 12, where it is drawn into the housing 14 and compressed by the compressor wheel 16. Air inlet conduit 38 communicates with a filter/silencer 40, through which air is drawn from ambient and filtered so that contaminant particles are removed. Air compressed by the compressor wheel 16 is discharged through discharge opening 42 in housing 14 into conduit 44, where it is communicated to the intake manifold 46 of the internal combustion engine 30. The pressurized air in intake manifold 46 is mixed with fuel in the normal manner to operate the engine 30.

Prior art attempts at controlling noise on the compressor side of the turbocharger 14 mainly were limited to the design of the filter/silencer 40, as it was believed that this was the only silencing necessary to quiet operation of the turbocharger 14. However, it has been discovered that pressure fluctuations in the conduits 38 and/or 44 are a significant cause of turbocharger noise. These pressure fluctuations are caused by the compressor wheel 16. Since these pressure fluctuations have been discovered to be a significant source of noise, it is desirable to attenuate these pressure fluctuations in order to quiet the turbocharger 12. Accordingly, one or more silencers 50, 52 are placed in the conduits 38, and 44. Depending upon the particular turbocharger, it may be necessary to place a silencer in the conduit 44 but not in conduit 38; to place a silencer in conduit 38 but not in conduit 44; or to place silencers in both of the conduits 38 and 44. Although a particular silencer is illustrated in FIG. 2, it is within the scope of the invention to use any known type of pressure attenuator, instead of the particular silencer illustrated in FIG. 2.

Referring now to FIG. 2, which illustrates the silencer 50, (but, as noted above, the silencer 52 is identical to silencer 50) apertures 54 are formed in portion 56 of the conduit 38. The portion 56 is generally substantially less than the entire length of the conduit 38. A solid tube 58, of substantial thickness as compared to the thickness of the walls of the conduit 38, is supported about the portion 56 by struts 60. Optionally, fiberglass 62 may be placed in the circumferential chamber 64 which is defined between the inner wall of the tube 58 and the outer circumferential surface of the portion 56. As is know to those skilled in the art, the size, number, and position of the apertures 54, and the length and thickness of the tube 58, may be varied to tune the attenuator 50 to attenuate the frequency of pressure fluctuations that are of greatest concern. Accordingly, pressure fluctuations generated in conduit 38 by operation of the compressor wheel will be attenuated by silencer 50, and pressure fluctuations generated in conduit 44 are attenuated by attenuator 52. Although attenuators are illustrated in both the conduits 38 and 44, as discussed hereinabove, it is likely that only the attenuator in the conduit in which the pressure fluctuations produce the most noticable noise will be used, an the other attenuator may be eliminated.

I claim:

1. Charge air system for an internal combustion engine, said engine including an intake manifold and an exhaust manifold, said system including a housing having an inlet and an outlet, a rotating compressor wheel within said housing for drawing air through the inlet, compressing the air drawn through the inlet, and ejecting the compressed air through the outlet, an inlet conduit connected to said inlet for communicating air to said inlet, an outlet conduit connected to said outlet and to said intake manifold for communicating compressed air from said outlet to said intake manifold, said compressor wheel being contoured to generate pressure fluctuations in at least one of said conduits during rotation of the compressor wheel, and pressure fluctuation attenuating means for attenuating said pressure fluctuations in at least one of said conduits to thereby reduce noise generated in a corresponding conduit by said pressure fluctuations.

2. Charge air system as claimed in claim 1, wherein said pressure fluctuation attenuating means is carried on a portion of the corresponding conduit, the corresponding conduit being substantially longer than the portion carrying the pressure fluctuation attenuating means.

3. Charge air system as claimed in claim 1, wherein the pressure fluctuation attenuating means is carried by the conduit communicating the outlet to the intake manifold.

4. Charge air system as claimed in claim 3, wherein said pressure fluctuation attenuating means includes openings in a portion of the conduit, and a nonperforated tube circumscribing said portion, said tube cooperating with said portion of the conduit to define a circumferentially extending chamber therebetween.

5. Charge air system as claimed in claim 4, wherein said tube has a length, said conduit having a predetermined number of said openings, said openings being spaced from one another, the length of said tube and the number and spacing of said openings being selected to attenuate pressure fluctuations of a predetermined frequency.

6. Charge air system as claimed in claim 2, wherein said pressure fluctuation attenuating means includes openings in said portion of the conduit, and a nonperforated tube circumscribing said portion, said tube cooperating with said portion of the conduit to define a circumferentially extending chamber therebetween.

7. Charge air system as claimed in claim 6, wherein said tube has a length, said conduit having a predetermined number of said openings, said openings being spaced from one another, the length of said tube and the number and spacing of said openings being selected to attenuate pressure fluctuations of a predetermined frequency.

8. Charge air system as claimed in claim 1, wherein said pressure fluctuation attenuating means attenuates pressure fluctuations in the outlet conduit.

9. Charge air system as claimed in claim 7, wherein said housing is a turbocharger housing, said compressor wheel being mounted on a shaft mounted for rotation within said housing, a turbine wheel mounted, within said housing on said shaft in spaced relationship to said compressor wheel, and means for communicating exhaust gasses from said exhaust manifold to said turbine wheel.

10. Charge air system as claimed in claim 4, wherein said housing is a turbocharger housing, said compressor wheel being mounted on a shaft mounted for rotation within said housing, a turbine wheel mounted within said housing on said shaft in spaced relationship to said compressor wheel, and means for communicating exhaust gasses from said exhaust manifold to said turbine wheel.

* * * * *